(12) United States Patent
Lee

(10) Patent No.: US 10,746,308 B2
(45) Date of Patent: Aug. 18, 2020

(54) VALVE APPARATUS AND CONTROLLING METHOD THEREFOR

(71) Applicant: KOREA AEROSPACE RESEARCH INSTITUTE, Daejeon (KR)

(72) Inventor: Joong Youp Lee, Daejeon (KR)

(73) Assignee: Korea Aerospace Research Institute, Daejeon (KR)

( * ) Notice: Subject to any disclaimer, the term of this patent is extended or adjusted under 35 U.S.C. 154(b) by 42 days.

(21) Appl. No.: 16/308,366

(22) PCT Filed: Aug. 29, 2016

(86) PCT No.: PCT/KR2016/009595
§ 371 (c)(1),
(2) Date: Dec. 7, 2018

(87) PCT Pub. No.: WO2017/213299
PCT Pub. Date: Dec. 14, 2017

(65) Prior Publication Data
US 2019/0128431 A1    May 2, 2019

(30) Foreign Application Priority Data

Jun. 8, 2016 (KR) .................. 10-2016-0071049

(51) Int. Cl.
*F16K 5/06* (2006.01)
*F16K 31/12* (2006.01)
*F16K 31/54* (2006.01)
*F16K 5/10* (2006.01)
*F16K 31/122* (2006.01)

(52) U.S. Cl.
CPC .............. *F16K 5/06* (2013.01); *F16K 5/0605* (2013.01); *F16K 5/10* (2013.01); *F16K 31/12* (2013.01); *F16K 31/122* (2013.01); *F16K 31/54* (2013.01)

(58) Field of Classification Search
CPC ..... Y10T 137/86726; Y10T 137/88022; F16K 5/10; F16K 5/0605; F16K 5/06
USPC ....................... 137/625.29, 614.16
See application file for complete search history.

(56) References Cited

U.S. PATENT DOCUMENTS 10,107,406 B2 * 10/2018 Obermark ............. F16K 15/183

FOREIGN PATENT DOCUMENTS

| JP | 2011-033160 A | 2/2011 |
| JP | 2015-215051 A | 12/2015 |
| KR | 10-0328121 B1 | 3/2002 |
| KR | 10-1264068 B1 | 5/2013 |

OTHER PUBLICATIONS

Machine Translation of JP 2015-215051, retrieved Mar. 16, 2020 (Year: 2015).*

* cited by examiner

*Primary Examiner* — Michael R Reid
(74) *Attorney, Agent, or Firm* — Rabin & Berdo, P.C.

(57) ABSTRACT

There is provided a valve apparatus provided in a pipe. The valve apparatus includes a bypass pipe connected in parallel to the pipe, a first valve configured to adjust a flow rate of a fluid flowing an inlet part of the pipe to an outlet part of the pipe, and a second valve configured to adjust a flow rate of the fluid flowing the bypass pipe to the outlet part.

14 Claims, 5 Drawing Sheets

VALVE APPARATUS AND CONTROLLING METHOD THEREFOR

TECHNICAL FIELD

The present invention relates to a valve used for adjusting a flow rate in a projectile, a dam, a liquefied gas ship, or a plant.

BACKGROUND ART

Valves are used for adjusting a flow rate and include ball valves.

A conventional ball valve includes a ball housing communicating with a pipe, a ball rotatably provided in the ball housing and having a linear flow path passing through a center of the thereof, and an actuator for rotation of the ball. Thus, when the ball rotates by the actuator so that the linear flow path of the ball is disposed in a direction of the pipe, an inner fluid of the pipe flows from a high-pressure side to a low-pressure side of the pipe.

However, the conventional ball valve has a problem that the actuator considerably increases in size because large driving torque is required due to large frictional force during the valve operation because of original characteristics of the ball valve even though a flow coefficient is high because the linear flow path is opened to almost the same size as an inner diameter of the pipe. In addition, the conventional ball valve has a problem that it is impossible to control the flow rate because an inherent flow coefficient curve of the ball valve has flow characteristics of a quick-open valve.

DISCLOSURE

Technical Problem

A technical object of the present invention is to provide a valve apparatus that is capable of reducing driving torque required for an operation and precisely controlling a flow rate and a method for controlling the same.

Technical Solution

In order to achieve the above object, an exemplary embodiment of the present invention provides a valve apparatus provided in a pipe, the valve apparatus including: a bypass pipe connected in parallel to the pipe; a first valve configured to adjust a flow rate of a fluid flowing an inlet part of the pipe to an outlet part of the pipe; a second valve configured to adjust a flow rate of the fluid flowing the bypass pipe to the outlet part; and a valve housing disposed between the inflow part and the outflow part to communicate with each of the inflow part and the outflow part, in which the bypass pipe has one end communicating with the valve housing and the other end communicating with the inflow part, and the first valve includes: a ball valve body rotatably provided in the valve housing to block the fluid flowing from the inflow part to the outflow part; and a first passage passing through the ball valve body in a first direction and allowing the inflow part and the outflow part to communicate with each other when the ball valve body rotates at a first angle.

The second valve may include: a second passage passing through the ball valve body in a second direction and allowing the bypass pipe and the first passage to communicate with each other; a third passage passing through the ball valve body in a third direction and allowing the first passage and the outflow part to communicate with each other; and a pintle valve body provided to be movable forward and backward in a longitudinal direction thereof in the bypass pipe and thereby to adjust a degree of opening of the second passage.

Effect

According to the embodiment of the present invention, the technical configuration including the bypass pipe, the first valve, and the second valve may be provided to reduce a difference in pressure between the inflow part and the outflow part of the pipe through the bypass pipe and the second valve, thereby reducing the driving torque required for the operation of the first valve and precisely controlling the flow rate through the two valves such as the first and second valves. Particularly, when the first valve is the ball valve, and the second valve is the pintle valve, these effects may more increase.

BEST MODE

Figure 1:
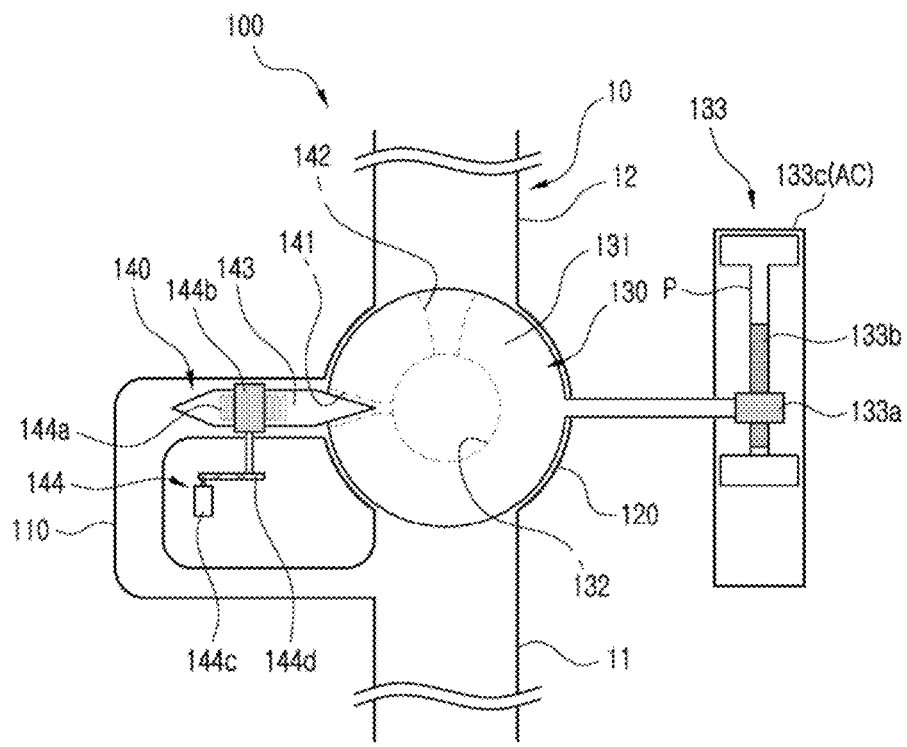
FIG. 1 is a schematic view illustrating a state in which a valve apparatus is provided in a pipe according to an embodiment of the present invention.

Hereinafter, preferred embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein.

As illustrated in FIGS. 1 to 9, a valve apparatus 100 according to an embodiment of the prevent invention is a valve apparatus provided in a pipe 10. The valve apparatus 100 includes a bypass pipe 110, a first valve 130, and a second valve 140. Furthermore, the above-described valve apparatus 100 according to an embodiment of the present invention may further include a valve housing 120 as illustrated in FIGS. 1 to 9. Hereinafter, each of constituents will be described in detail with reference to FIGS. 1 to 9.

The bypass pipe 110 is a constituent for bypassing a fluid of the pipe 10 and connected in parallel to the pipe 10 as illustrated in FIG. 1. Particularly, as illustrated in FIG. 1, the bypass pipe 110 may have one end communicating with the valve housing 120 and the other end communicating with an inflow part 11 of the pipe 10.

The valve housing 120 is a constituent in which a ball valve body 131 that will be described later is rotatably disposed. The valve housing 120 may be disposed between the inflow part 11 of the pipe 10 and an outflow part 12 of the pipe 10. Particularly, the valve housing 120 may have one end communicating with the inflow part 11 and the other end communicating with the outflow part 12.

Figure 7:
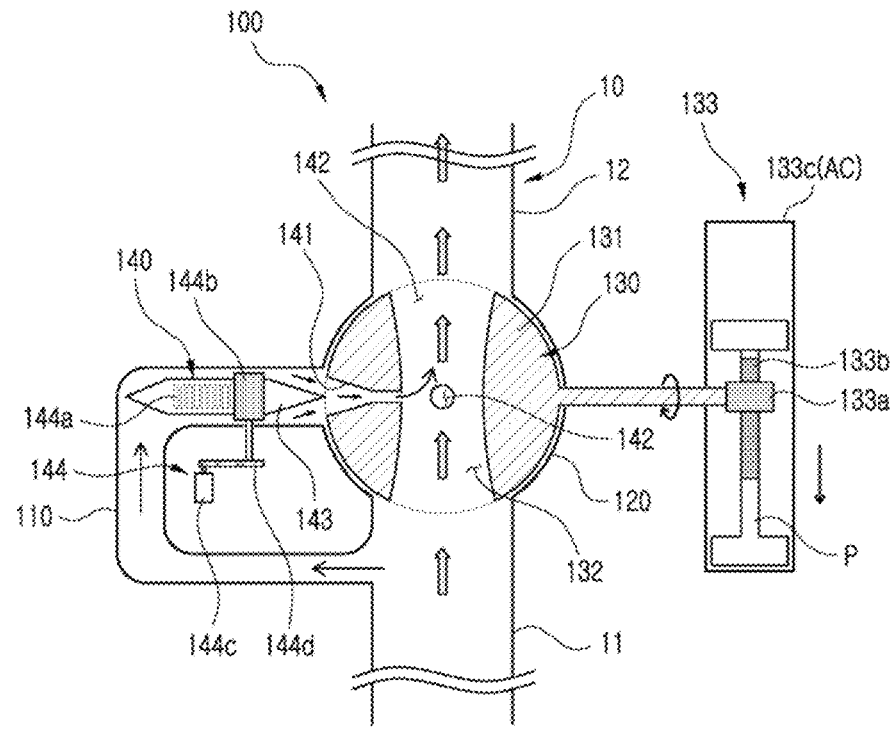
FIG. 7 is a schematic view illustrating a state in which a degree of opening of the first valve is 100% in the valve apparatus of FIG. 6.

As illustrated in FIGS. 1 and 7, the first valve 130 is a constituent that adjusts a flow rate of the fluid flowing from the inflow part 11 of the pipe 10 to the outflow part 12 of the pipe 10. For example, as illustrated in FIGS. 1 to 3, and 7, the first valve 130 may include a ball valve body 131 and a first passage 132. The ball valve body 131 has a sphere shape and is rotatably provided in the valve housing 120 to block the fluid flowing from the inflow part 11 to the outflow part 12. The first passage 132 passes through the ball valve body 131 in a first direction. As illustrated in FIG. 7, when the ball valve body 131 rotates at a first angle (e.g., about 90 degrees), the inflow part 11 and the outflow part 12 communicate with each other by the first passage 132.

Figure 3:
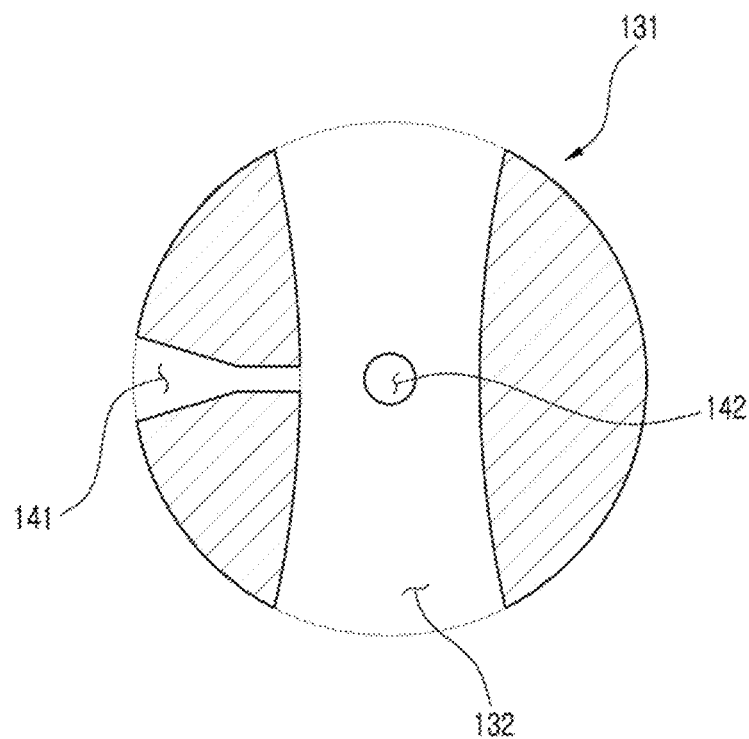
FIG. 3 is a cross-sectional view taken along line in the ball valve body of FIG. 2.
Figure 4:
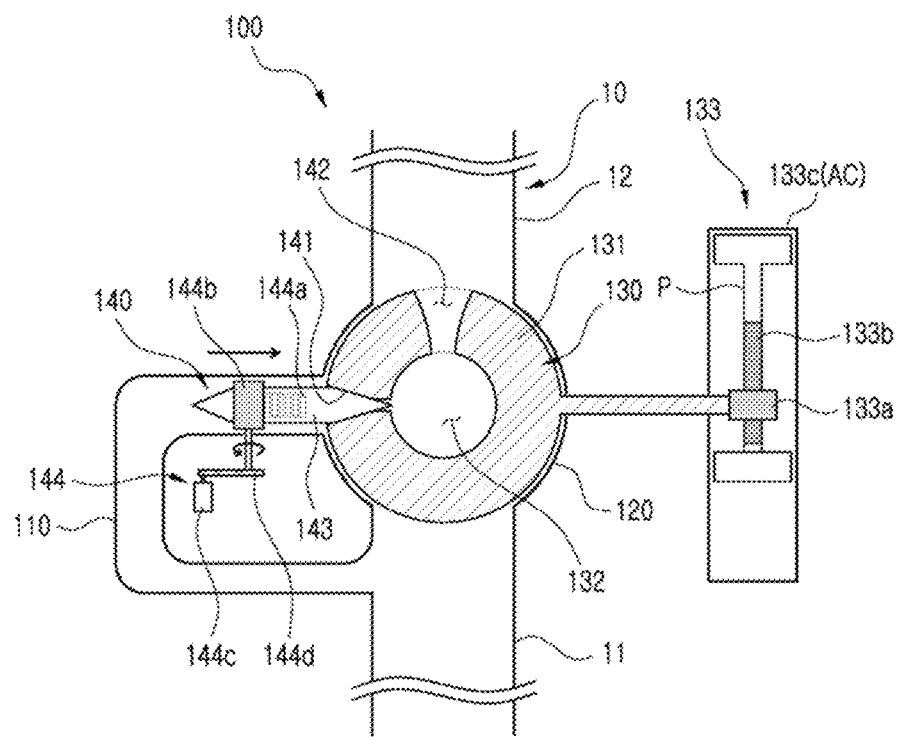
FIG. 4 is a schematic view illustrating a state in which first and second valves of the valve apparatus of FIG. 1 are closed.
Figure 5:
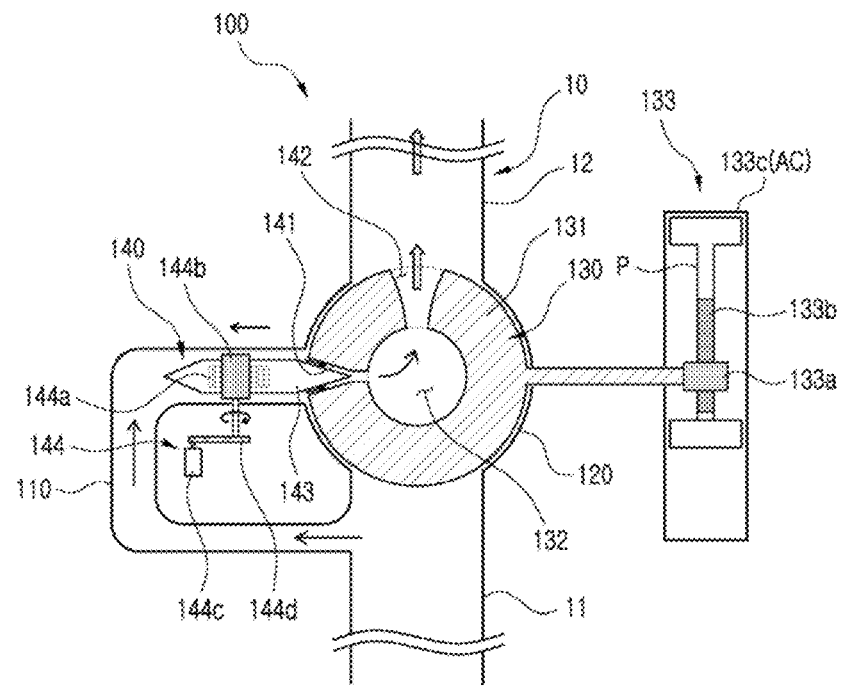
FIG. 5 is a schematic view illustrating a state in which a degree of opening of the second valve is about 50% in the valve apparatus of FIG. 4.

As illustrated in FIGS. 1, 4, and 5, the second valve 140 is a constituent that adjusts a flow rate of the fluid flowing from the bypass pipe 110 to the outflow part 12 of the pipe 10. For example, as illustrated in FIGS. 1 to 5, the second valve 140 may include a second passage 141, a third passage 142, and a pintle valve body 143. The second passage 141 passes through the ball valve body 131 in a second direction to allow the bypass pipe 110 to communicate with the first passage 132, and the third passage 142 passes through the ball valve body 131 in a third direction to allow the first passage 132 to communicate with the outflow part 12 of the pipe 10. Also, the pintle valve body 143 is provided to be movable forward and backward in a longitudinal direction thereof in the bypass pipe 110, thereby adjusting a degree of opening of the second passage 141.

Figure 2:
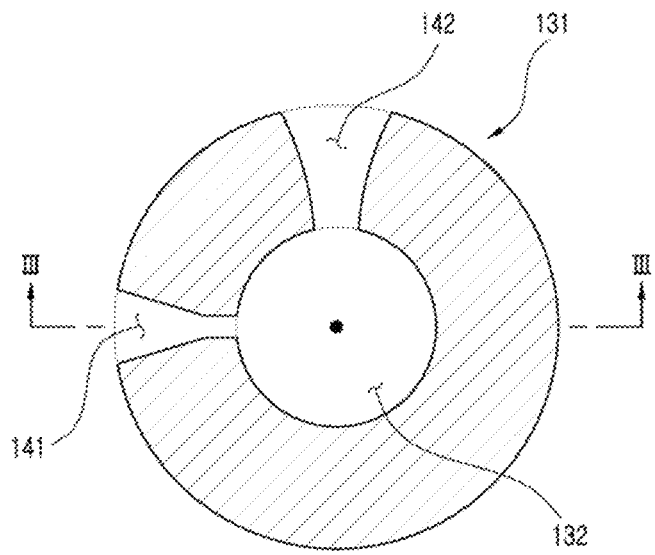
FIG. 2 is a schematic cross-sectional view illustrating a ball valve body of the valve apparatus of FIG. 1.
Figure 8:
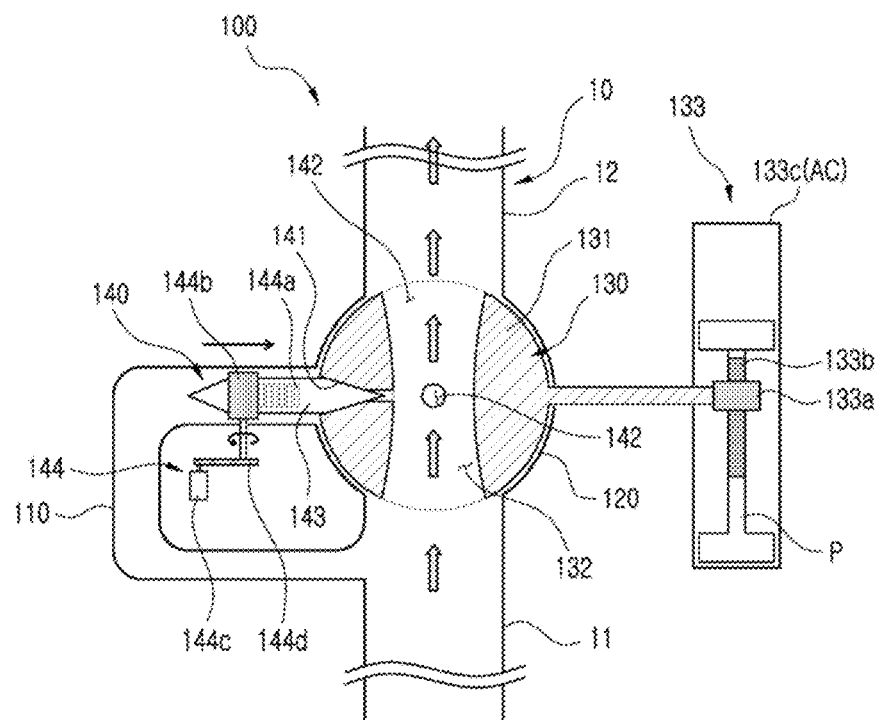
FIG. 8 is a schematic view illustrating a state in which the second valve is fully closed in the valve apparatus of FIG. 7.

Particularly, the first, second, and third directions in which the first, second, and third passages 132, 141, and 142 pass through the ball valve body 131 may be perpendicular to each other as illustrated in FIGS. 2 and 3. Thus, as illustrated in FIG. 5, in an initial state, the flow of the fluid between the inflow part 11 and the outflow part 12 of the pipe 10 may be blocked by the ball valve body 131, and simultaneously, the bypass pipe 110 and the outflow part 12 of the pipe 10 may communicate with each other through the second and third passages 141 and 142. As illustrated in FIG. 7, the ball valve body 131 rotates at an angle of about 90 degrees to allow the inflow part 11 and the outflow part 12 of the pipe 10 to communicate with each other through the first passage 132 and also to allow the bypass pipe 110 and the outflow part 12 of the pipe 10 to communicate with each other through the first and second passages 132 and 141. Also, as illustrated in FIG. 8, the inflow part 11 and the outflow part 12 of the pipe 10 may communicate with each other through the first passage 132, and simultaneously, the second passage 141 is closed by using the pintle valve body 143 to block the flow of the fluid between the bypass pipe 110 and the outflow part 12.

Furthermore, as illustrated in FIGS. 1 to 8, the first passage 132 may have a size greater than that of each of the second and third passages 141 and 142. Thus, as illustrated in FIG. 7, when the ball valve body 131 may rotate at an angle of about 90 degrees to open the first passage 132, about 80% of the flow rate of the inflow part 11 may be transferred to the outlet part 12, and also, about 20% of the flow rate may be transferred to the outflow part through the second passage 141.

Also, as illustrated in FIGS. 1 and 4, the second passage 141 may have a shape that gradually decreases in diameter toward the inside of the ball valve body 131. An end of the pintle valve body 143 corresponding to the second passage 141 may have a shape corresponding to that of the second passage 141. Particularly, when each of the end of the pintle valve body 143 and the end of the second passage 141 may have an approximately truncated cone shape, a degree of opening of the second passage 141 may be more precisely controlled due to an increase of a contact area therebetween.

Also, as illustrated in FIG. 1, the second passage 141 may be provided at a rotating center of the ball valve body 131. Thus, as illustrated in FIGS. 4 and 7, even though the ball valve body 131 rotates, the second passage 141 may always be in place.

Furthermore, as illustrated in FIG. 1, the above-described first valve 130 may further include a first driving part 133 for the rotation of the ball valve body 131. For example, as illustrated in FIGS. 1 and 7, the first driving part 133 may include a first pinion 133a, a first rack 133b, and a first driving source 133c. The first pinion 133a is fixed to the rotating center of the ball valve body 131, and the first rack 133b is engaged with the first pinion 133a to allow the first pinion 133a to rotate. Also, the first driving source 133c allows the first rack 133b to reciprocate. Particularly, in order to allow the ball valve body 131 to rotate within the valve housing 120, large torque is required due to friction between the ball valve body 131 and the valve housing 120. Thus, a pneumatic cylinder AC may be employed as the first driving source 133c rather than a motor. That is, as illustrated in FIGS. 1 and 7, the first driving source 133c may be the pneumatic cylinder AC, and the first rack 133b may be provided on a piston P of the pneumatic cylinder AC. Alternatively, when a difference in pressure between the inflow part 11 and the outflow part 12 of the pipe 10 is reduced through the bypass pipe 110 and the second valve 140, the frictional force between the ball valve body 131 and the valve housing 120 may also be reduced. Thus, the motor or a relatively small-sized pneumatic cylinder may be employed.

Furthermore, as illustrated in FIG. 1, the above-described second valve 140 may further include a second driving part 144 for the forward and backward movement of the pintle valve body 143. For example, as illustrated in FIGS. 1 and 5, the second driving part 144 may include a second rack 144a, a second pinion 144b, and a second driving source 144c. The second rack 144a defines one surface of the pintle valve body 143, and the second pinion 144b is engaged with the second rack 144a to allow the second rack 144a to reciprocate forward and backward. Also, the second driving source 144c allows the second pinion 144b to rotate. Particularly, since the pintle valve body 143 moves forward and backward by small force, the second driving source 144c may be a motor rather than a pneumatic cylinder. Furthermore, a reduction gear 144d may be further provided between the second driving source 144c that is the motor and the second pinion 144b in consideration of force acting on the pintle valve body 143.

Hereinafter, a method for controlling the valve apparatus according to another embodiment of the present invention will be described with reference to FIGS. 4 to 8.

Figure 6:
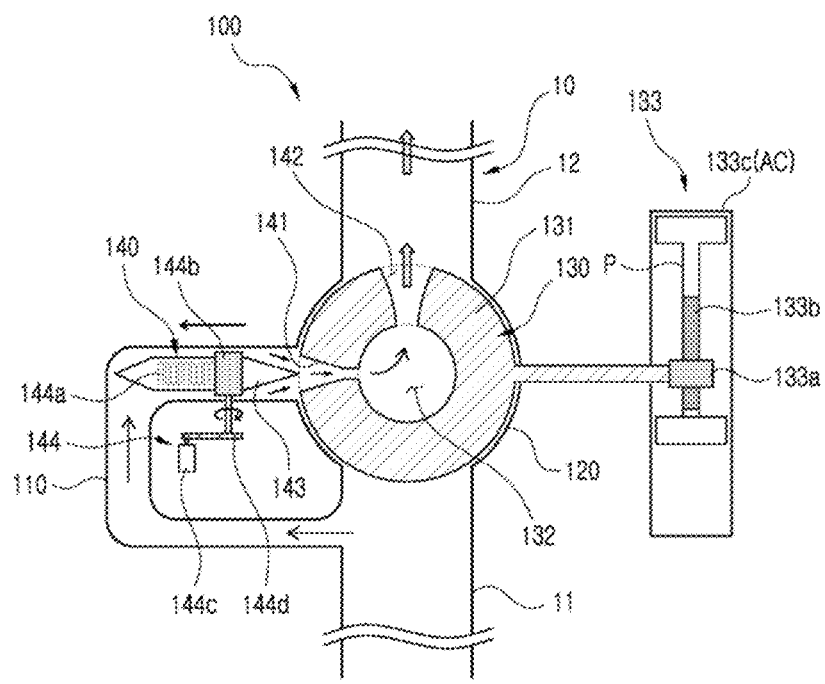
FIG. 6 is a schematic view illustrating a state in which a degree of opening of the second valve is 100% in the valve apparatus of FIG. 5.

According to the method for controlling the valve apparatus according to another embodiment of the present invention, in an initial state in which first and second valves 130 and 140 are closed as illustrated in FIG. 4, a degree of opening of the second valve 140 gradually increases so that a flow rate of a fluid flowing from a bypass pipe 110 to an outflow part 12 of a pipe 10 increases as illustrated in FIGS. 5 and 6. That is to say, in the initial state in which a first passage 132 is closed by using a ball valve body 131, and a second passage 141 is closed by using a pintle valve body 143 as illustrated in FIG. 4, the pintle valve body 143 gradually moves backward in a direction in which the second passage 141 is opened so that the flow rate of the fluid flowing from the bypass pipe 110 to the outflow part 12 of the pipe 10 increases as illustrated in FIGS. 5 and 6.

Thereafter, when the second valve 140 is fully opened as illustrated in FIG. 6, while maintaining the fully opened state of the second valve 140, a degree of opening of the first valve 130 gradually increases so that the flow rate of the fluid flowing from the inflow part 11 of the pipe 10 to the outflow part 12 of the pipe 10 increases as illustrated in FIG. 7. That is to say, when the second passage 141 is fully opened as illustrated in FIG. 6, while maintaining the fully opened state of the second passage 141, the ball valve body 131 rotates to open the first passage 132 so that the flow rate of the fluid flowing from the inflow part 11 of the pipe 10 to the outflow part 12 of the pipe 10 increases as illustrated in FIG. 7.

Thus, about 20% of the total flow rate may be generated through the bypass pipe 110 and the second valve 140. Therefore, the flow rate and the pressure may be precisely controlled within about 20% of the total flow rate. Also, before the ball valve body 131 rotates, a difference in pressure between the inflow part 11 and the outflow part 12 of the pipe 10 may be previously reduced through the bypass pipe 110 and the second valve 140. As a result, frictional force between the ball valve body 131 and the valve housing 120 may be significantly reduced, and thus, the ball valve body 131 may rotate with small driving torque to reduce a size of a first driving part 133.

Furthermore, in the method for controlling the valve apparatus according to another embodiment of the present invention, when the first valve 130 is fully opened as illustrated in FIG. 8, the second valve 140 is closed while maintaining the fully opened state of the first valve 130. That is to say, when the first passage 132 is fully opened as illustrated in FIG. 8, while maintaining the fully opened state of the first passage 132, the pintle valve body 143 moves forward to close the second passage 141.

Thus, the fluid may flow through only the first passage 132 to realize a stable flow.

Figure 9:
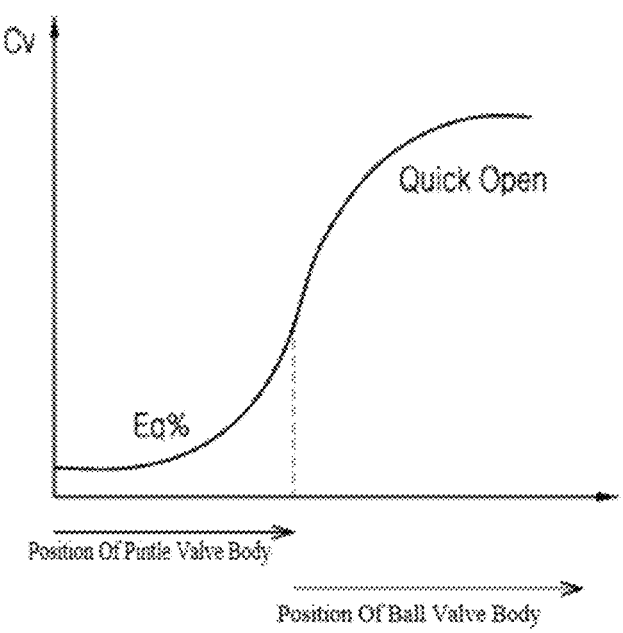
FIG. 9 is a graph of a flow coefficient curve showing that a flow rate is precisely controlled through a pintle valve body of the second valve and a ball valve body of the first valve.

Hereinafter, characteristics of the first and second valves 130 and 140 will be additionally described with reference to FIG. 9.

The precise pressure/flow rate control may be performed by using an equivalent % (EQ %) curve that is a flow coefficient curve of the second valve 140 including the pintle valve body 143 in an initial period of the flow coefficient curve. Here, a flow rate through the second valve 140 that is the pintle valve may be about 20% with respect to the total flow rate.

Also, the flow rate exceeding about 20% with respect to the total flow rate may no longer be controlled by the second valve 140 including the pintle valve body 143. Thus, the flow may be generated to form a flow coefficient curve having flow characteristics of a quick-open valve of the first valve 130 including the ball valve body 131. Here, the flow rate through the first valve 130 may be about 80% that is a remaining flow rate.

As described above, the valve apparatus 100 and the method for controlling the same according to the embodiments of the present invention may have following effects.

According to an embodiment of the present invention, the technical configuration including the bypass pipe 110, the first valve 130, and the second valve 140 may be provided to reduce a difference in pressure between the inflow part 11 and the outflow part 12 of the pipe 10 through the bypass pipe 110 and the second valve 140, thereby reducing the driving torque required for the operation of the first valve 130 and precisely controlling the flow rate through the two valves such as the first and second valves 130 and 140. Particularly, when the first valve 130 is the ball valve, and the second valve 140 is the pintle valve, these effects may more increase.

The invention claimed is:

1. A valve apparatus provided in a pipe, the valve apparatus comprising:
   a bypass pipe connected in parallel to the pipe;
   a first valve configured to adjust a flow rate of a fluid flowing in an inlet part of the pipe to an outlet part of the pipe;
   a second valve configured to adjust a flow rate of the fluid flowing in the bypass pipe to the outlet part; and
   a valve housing disposed between the inlet part and the outlet part to communicate with each of the inlet part and the outlet part,
   wherein the bypass pipe has one end communicating with the valve housing and another end communicating with the inlet part, and
   the first valve includes:
   a ball valve body rotatably provided in the valve housing to block the fluid flowing from the inlet part to the outlet part; and
   a first passage passing through the ball valve body in a first direction and allowing the inlet part and the outlet part to communicate with each other when the ball valve body rotates at a first angle,
   wherein the second valve includes:
   a second passage passing through the ball valve body in a second direction and allowing the bypass pipe and the first passage to communicate with each other;
   a third passage passing through the ball valve body in a third direction and allowing the first passage and the outlet part to communicate with each other; and
   a pintle valve body provided to be movable forward and backward in a longitudinal direction thereof in the bypass pipe and thereby to adjust a degree of opening of the second passage.

2. The valve apparatus of claim 1, wherein the first, second, and third directions are perpendicular to each other.

3. The valve apparatus of claim 1, wherein the first passage has a size greater than a size of each of the second and third passage.

4. The valve apparatus of claim 1, wherein the second passage has a diameter that gradually decreases toward an inside of the ball valve body, and
   an end of the pintle valve body corresponding to the second passage has a shape corresponding to a shape of the second passage.

5. The valve apparatus of claim 1, wherein the second passage is provided at a rotating center of the ball valve body.

6. The valve apparatus of claim 1, wherein the first valve further includes a first driving part configured to allow the ball valve body to rotate.

7. The valve apparatus of claim 6, wherein the first driving part includes:
- a first pinion fixed to a rotating center of the ball valve body;
- a first rack engaged with the first pinion to allow the first pinion to rotate; and
- a first driving source configured to allow the first rack to reciprocate.

8. The valve apparatus of claim 7, wherein the first driving source is a pneumatic cylinder, and
the first rack is provided on a piston of the pneumatic cylinder.

9. The valve apparatus of claim 1, wherein the second valve further includes a second driving part configured to allow the pintle valve body to move forward and backward.

10. The valve apparatus of claim 9, wherein the second driving part includes:
- a second rack defining one surface of the pintle valve body;
- a second pinion engaged with the second rack to allow the second rack to reciprocate forward and backward; and
- a second driving motor or pneumatic cylinder configured to allow the second pinion to rotate.

11. A method for controlling the valve apparatus of claim 1, the method comprising:
- allowing a degree of opening of the second valve to gradually increase so that a flow rate of the fluid flowing from the bypass pipe to the outlet part increases in an initial state in which the first and second valves are closed; and
- allowing a degree of opening of the first valve to gradually increase so that a flow rate of the fluid flowing from the inlet part to the outlet part increases while maintaining a fully opened state of the second valve when the second valve is fully opened.

12. The method of claim 11, further comprising closing the second valve while maintaining a fully opened state of the first valve when the first valve is fully opened in the allowing of the degree of opening of the first valve to gradually increase.

13. A method for controlling the valve apparatus of claim 1, the method comprising:
- allowing the pintle valve body to gradually move backward in a direction in which the second passage is opened so that a flow rate of the fluid flowing through the bypass pipe to the outlet part increases in an initial state in which the first passage is closed by the ball valve body, and the second passage is closed by the pintle valve body; and
- allowing the ball valve body to rotate and thereby to open the first passage so a flow rate of the fluid flowing from the inlet part to the outlet part increases while maintaining a fully opened state of the second passage when the second passage is fully opened.

14. The method of claim 13, further comprising allowing the pintle valve body to move forward so that the second passage is closed while maintaining a fully opened state of the first passage when the first passage is fully opened in the opening of the first passage.

\* \* \* \* \*